United States Patent [19]
Iida

[11] Patent Number: 5,669,023
[45] Date of Patent: Sep. 16, 1997

[54] OPTIMAL CHARGING AND ENERGY CONSERVING APPARATUS AND METHOD FOR CONTROLLING CAMERA FUNCTIONS IN AN AUTOMATIC FLASH CAMERA

[75] Inventor: Yoshikazu Iida, Kanagawa-ken, Japan

[73] Assignee: Nikon Corporation, Tokyo, Japan

[21] Appl. No.: 562,630

[22] Filed: Nov. 24, 1995

[30] Foreign Application Priority Data

Jul. 25, 1995 [JP] Japan ................................. 7-189621

[51] Int. Cl.⁶ ..................................................... G03B 15/05
[52] U.S. Cl. .......................... 396/129; 396/165; 396/206
[58] Field of Search ................................ 354/418, 419, 354/400, 402

[56] References Cited

U.S. PATENT DOCUMENTS

| | | | |
|---|---|---|---|
| 3,896,459 | 7/1975 | Ogawa et al. | 354/402 |
| 3,917,395 | 11/1975 | Ogawa | 354/412 |
| 3,953,864 | 4/1976 | Iwata et al. | 354/418 |
| 4,064,519 | 12/1977 | Kee | 354/141 |
| 4,192,587 | 3/1980 | LaRocque et al. | 354/414 |
| 4,969,007 | 11/1990 | Otani et al. | 354/413 |

*Primary Examiner*—W. B. Perkey
*Attorney, Agent, or Firm*—Oliff & Berridge

[57] ABSTRACT

An autofocusing camera allows a distance measurement operation even if the electric charge amount accumulated in the condenser does not reach a predetermined value when a picture to be taken does not require flash (strobe) light emission.

17 Claims, 10 Drawing Sheets

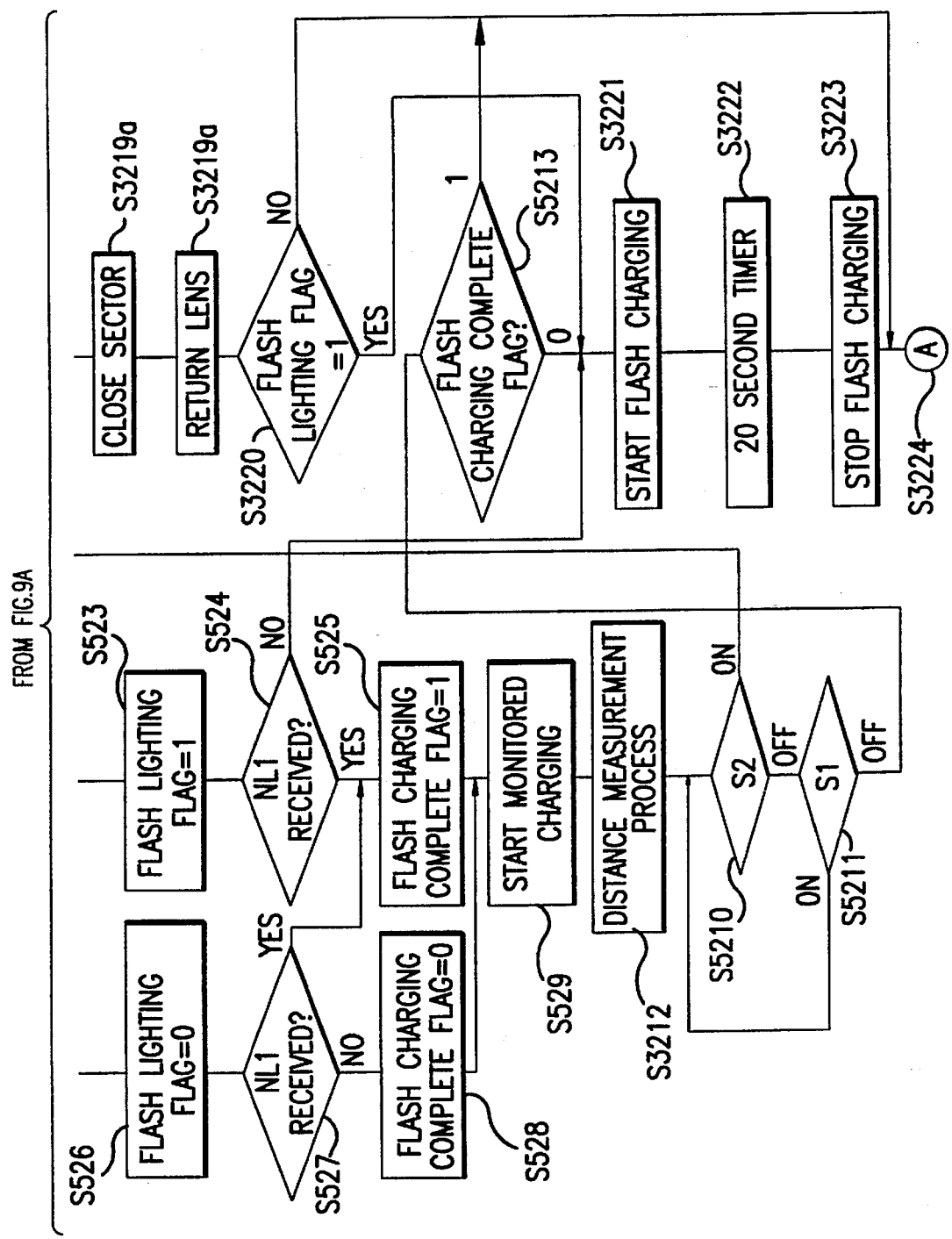

OPTIMAL CHARGING AND ENERGY CONSERVING APPARATUS AND METHOD FOR CONTROLLING CAMERA FUNCTIONS IN AN AUTOMATIC FLASH CAMERA

BACKGROUND OF THE INVENTION

1. Field of the Invention

The present invention relates to a camera including a condenser to accumulate an electric charge. In particular, a camera having a built-in or externally connected flash device is capable of making the light emitting tube of the flash device emit light during the exposure operation using the electric charge accumulated in the condenser.

2. Description of Related Art

When the main capacitor of a camera flash device is not sufficiently charged at the time of photographing, the resultant photograph is a failure because of insufficient exposure. A conventional camera is known that prevents such failure by prohibiting the corresponding shutter operation if the release button is fully depressed when the main flash capacitor of the flash device is not charged. See also, U.S. Pat. No. 3,953,864 to Iwata et al., the subject matter of which is incorporated herein by reference.

However, in such a camera provided with autofocusing, when the shutter release button is half depressed, distance measurement and the associated focusing movement of the objective lens are performed even if the flash main capacitor has not been charged. Even if the release button is thereafter continuously fully depressed, release of the shutter is prevented because of the insufficient charge of the main capacitor. In this case, the distance measurement and focusing operation are useless because shutter release was prevented, resulting in wasteful electricity consumption.

SUMMARY OF THE INVENTION

Therefore, an object of the present invention is to provide an optimal charging and energy conserving automatic flash camera by controlling camera functions.

Another object is to conserve power by limiting camera charging when possible to the main camera routine. When charging occurs in the half-depression routine, another object is to limit the charging to only when necessary for photographing, and when necessary, to perform charging before other camera functions.

Another object is to conserve power by controlling camera functions during exposure until the condenser is charged to a sufficient predetermined level and to optimally charge the condenser when charging occurs.

A camera according to the present invention initially charges the condenser when the camera power is turned on in the main control routine, unless interrupted. If interrupted by photographing during the main routine, the camera attempts further charging in the half-depression routine. However, if a flash is not necessary for the photograph, charging in the half-depression routine is prohibited to conserve energy and save time checking for sufficient condenser charge. Further, unnecessary photographing delays are avoided.

The camera achieves at least these objects by allowing at least distance measurement operations independent of the condenser charge if a light emitting determination device determines the photographing does not need a flash. If the photographing needs a flash, the distance measurement operation is prevented until the condenser charge is sufficient to conserve energy.

The camera can include, for example, a distance measurement device to execute a distance measuring operation that measures a distance to a photographic object. Before the distance measurement operation, a condenser that can store a predetermined electric charge sufficient to emit light from a light emitting tube is charged. An electric charge amount determination device determines whether the electric charge amount in the condenser reached the predetermined amount. Further, the distance measurement operation is prohibited if the electric charge amount charged in the condenser has not reached the predetermined amount. The camera can also include a light emitting determination device that determines whether to make the light emitting tube emit light during exposure. The execution of the distance measurement operation is allowed independent of the determination by the electric charge amount determination device if the light emitting determination device determines that the light emitting tube will not emit light during the photograph exposure.

The camera is preferably configured so that the light emitting determination device determination is made before the determination by the electric charge amount determination device. If the determination is made to not emit light from the light emitting tube during exposure of the photograph, the determination by the electric charge amount determination device is prohibited.

The light emitting determination device can, for example, contain a photometry device to measure object illuminance. Then, the determination to emit light from the light emitting tube during the exposure is only made if the object illuminance does not reach a predetermined value.

This and other objects, advantages and features of the invention are described in or apparent from the following detailed description of preferred embodiments.

BRIEF DESCRIPTION OF THE DRAWINGS

The preferred embodiments will be described with reference to the annexed drawings, in which like reference numerals refer to like elements, and wherein:

FIG. 9A–9B are a flow chart showing a control subroutine according to yet another embodiment of the present invention that is initiated in response to half depression of the shutter release button.

DETAILED DESCRIPTION OF PREFERRED EMBODIMENTS

Figure 1:
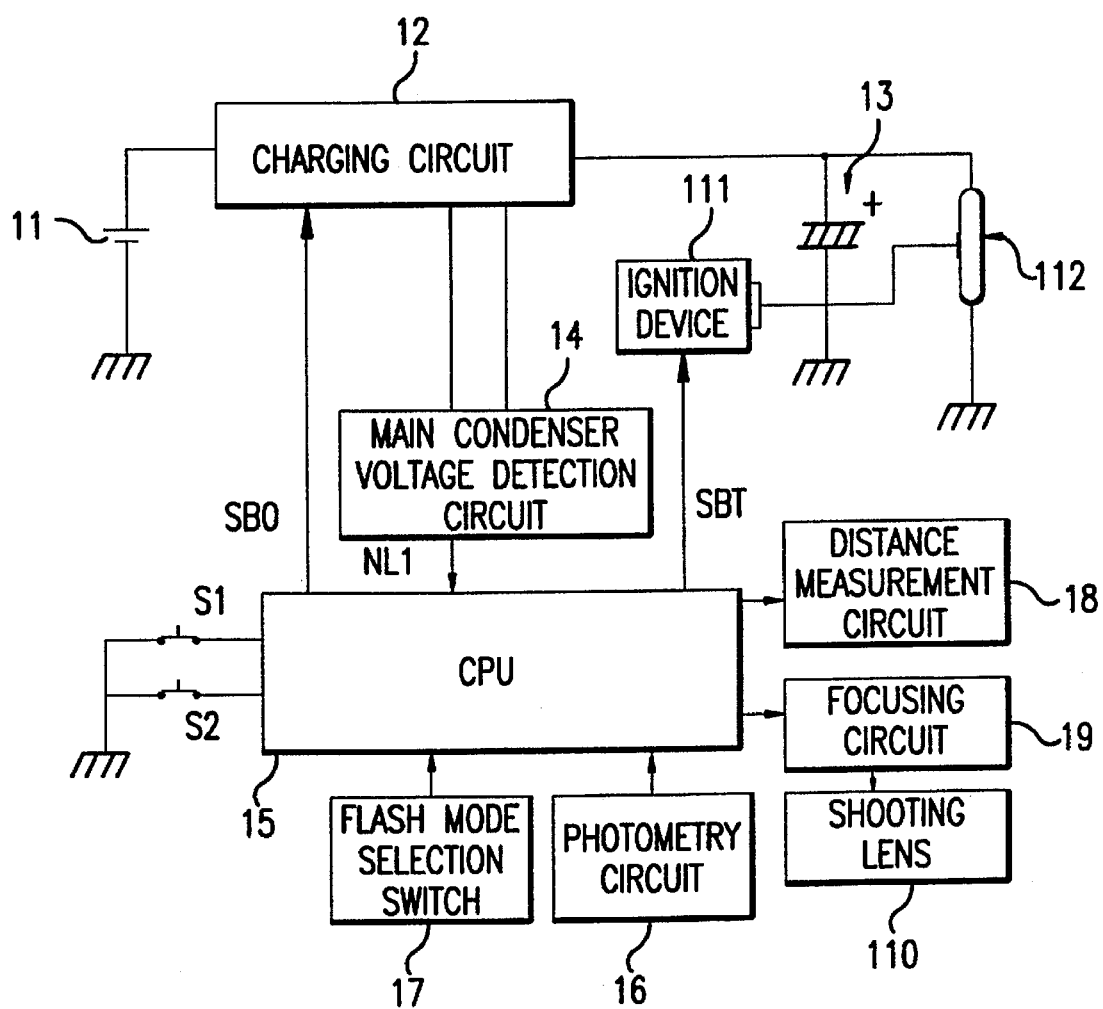
FIG. 1 shows a partial block diagram of a camera circuitry according to one embodiment of the present invention.

Referring to FIG. 1, the camera circuitry for performing and controlling the performance of various camera functions in an automatic flash camera according to a first embodiment of the present invention includes a central processor unit controller or CPU 15, and various components responsive to control signals produced by CPU 15 for performing specific camera functions. The components can include, for example, at least a distance measurement circuit 18, a photometry circuit 16, a focusing circuit 19, a shooting lens 110, and a flash device that can have a charging circuit 12, a main condenser 13, a flash discharge tube 112 and a main condenser voltage detection circuit 14. The flash device can be included within the camera or externally attached to the camera. The CPU 15 advantageously controls all camera functions, as shown in FIG. 1.

It will be appreciated by those skilled in the art that the camera circuitry may be implemented as a single special purpose integrated circuit (e.g., ASIC) having a main or central processor section for overall, system-level control, and separate sections dedicated to performing various different specific computations, functions and other processes under control of the central processor section. The camera circuitry can also be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller CPU can also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIGS. 3–4 and 7–9 can be used to implement the camera circuitry. As shown, a distributed processing architecture is preferred for maximum data/signal processing capability and speed.

As shown in FIG. 1, when a power source switch (not shown) is turned on, the CPU 15 outputs an SBO signal to a charging circuit 12. An SBO low level signal starts charging of the main condenser 13 by the charging circuit 12. At the same time as the CPU 15 outputs the SBO signal to the charging circuit 12, the CPU 15 starts counting a predetermined time (preferably 20 seconds) with a timer (not shown). When the charge amount accumulated in the main condenser 13 reaches a first predetermined amount, the main condenser voltage detection circuit 14 outputs an NL1 signal to the CPU 15. The first predetermined amount is preferably defined as the minimum electric charge amount that is necessary for the flash discharge tube to emit sufficient light for the photograph. Charging of the main condenser 13 continues until the timer (not shown) completes measuring 20 seconds. Then, the CPU 15 changes the output SBO signal from low level to high level. The SBO high level signal stops charging of the main condenser 13 by the charging circuit 12.

The predetermined time interval, preferably 20 seconds, is selected to provide, when the battery voltage is above a minimum level, a condenser charge voltage that exceeds the NL1 voltage level, but does not exceed a maximum voltage for the main condenser 13.

Thus, after the 20 second timed charging, the electric charge amount of the main condenser 13 is no less than the first predetermined amount (NL1 signal) and no greater than the maximum voltage. The maximum voltage is preferably defined as the excess amount of electrical charge (greater than the NL1 charge amount) that can endanger destruction of the main condenser 13.

It will be apparent to those skilled in the art that the time to start charging of the main condenser 13 is not limited to when the power source switch (not shown) is turned on. Neither is the charge stopping time limited to the 20 second timer elapsing. The SBO high signal that stops charging, for example, can be output responsive to the NL1 signal. Further, the timer is not limited to 20 seconds. A detailed explanation of charge starting/stopping timing will be described below.

When a release button (not shown) is half-depressed, a switch S1 is turned ON. When the switch S1 turns ON during charging of the main condenser 13, the CPU 15 turns the SBO signal from low level to high level to stop the main condenser 13 charging. Then, the CPU 15 measures a photographic object illuminance with the photometry circuit 16 and stores the result. In addition, the CPU 15 determines whether it is necessary to fire a flash (strobe) for flash lighting of the photograph. The flash firing determination is based on the condition of a flash mode selection switch 17 and the data resulting from the photometry process using the photometry device 16. The flash mode selection switch 17 selects among the auto flash mode, the flash prevention mode and the forced flash mode. The auto flash mode is preferably where the CPU 15 automatically determines whether to use flash lighting from a light emitting tube based on the photometric data. The flash prevention mode is preferably where the flash is prohibited independent of the photometric data by preventing the output of an SBT signal (strobe trigger signal) from the CPU 15 to an ignition device 111. The forced flash mode is preferably where the flash lighting is performed using a light emitting xenon tube (Xe) during exposure of the photograph independent of the photometric data. The determination whether a flash is needed will be described below.

When the release button (not shown) is fully depressed, a switch S2 is turned ON. Upon the turning ON the switch S2, the CPU 15 controls further camera operations based on the flash firing determination whether a flash is needed, and, if necessary, whether the NL1 signal has been received (i.e., whether the electric charge amount accumulated in the main condenser 13 has reached the first predetermined amount). Further camera operations can include, for example, initiating the distance measuring circuit 18 to measure the distance from the camera to the photographic object, driving the shooting lens 110 using the focusing circuit 19 based on the result of the distance measurement, and causing the light emitting tube (Xe) 112 to emit light by the ignition device 111 when the ignition device 111 receives the SBT signal from the CPU 15.

Figure 2:
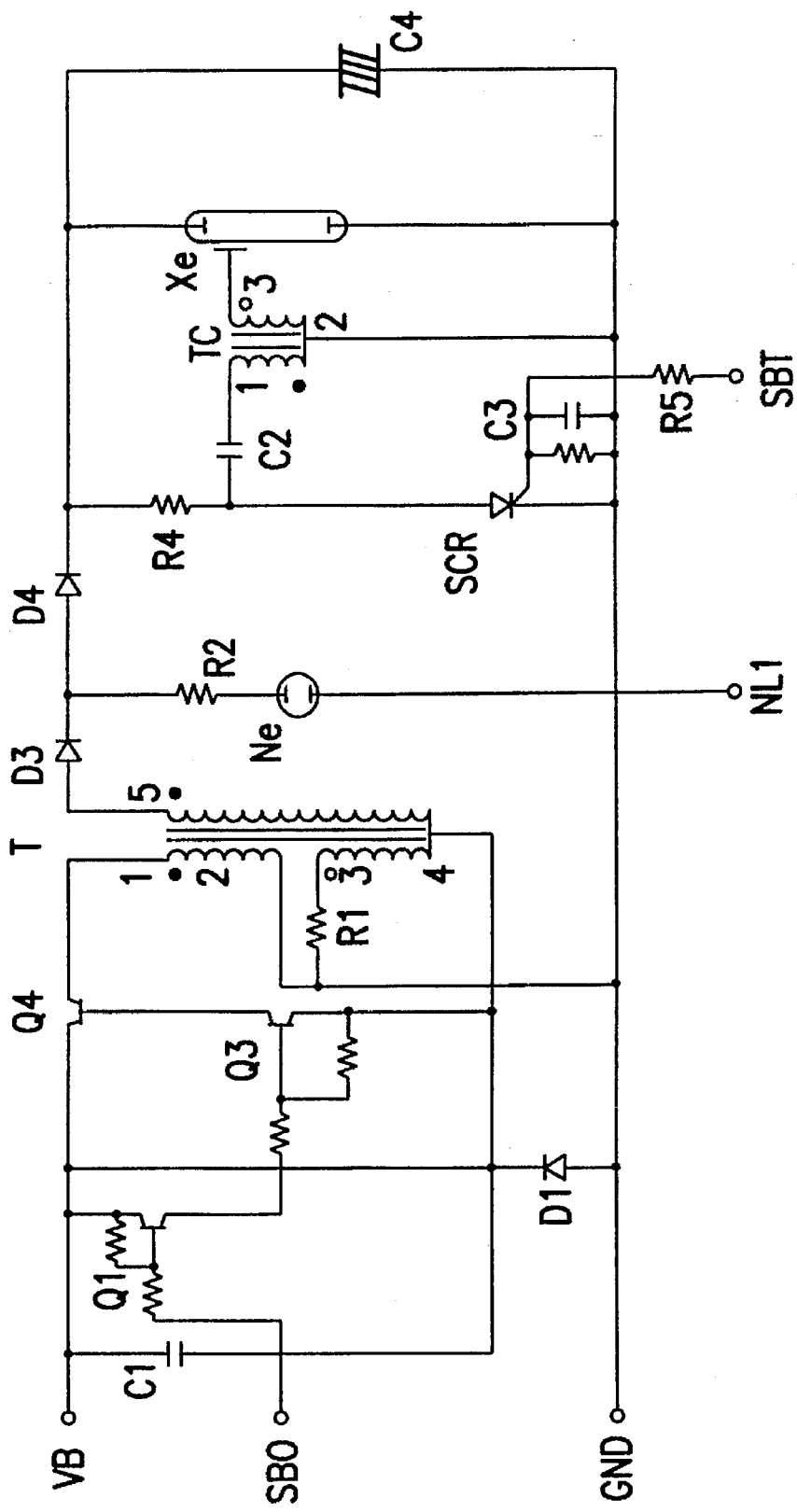
FIG. 2 is a circuit diagram showing a charging circuit, a main condenser, a main condenser voltage detection circuit, an ignition device, and a light emitting tube according to the camera of FIG. 1.

As shown in FIG. 2, a battery applies a voltage between a terminal VB and a terminal GND. When the power source switch is turned ON, the low level SBO signal is input from the CPU 15 to a SBO terminal and a transistor Q1 is turned on. Also at this time, the CPU 15 starts counting time with the 20 second timer. Turning the transistor Q1 on causes a transistor Q3 to turn on, and a pressure increase circuit composed of a blocking oscillator well known in the art starts operation. The blocking oscillator preferably includes a transformer T, a transistor Q4, a condenser C1, and a resistor R2. The output voltage from the pressure increase circuit is supplied to a main condenser C4 through a diode D3 and a diode D4 to accumulate electric charge in the main condenser C4. The main condenser C4 corresponds to the main condenser 13 in FIG. 1.

When the electric charge amount stored in the main condenser C4 reaches the first predetermined amount, a portion of the electric current from the diode D3 to the diode D4 passes through the resistor R2 and lights the neon tube Ne. Thus, the neon tube Ne turns on when voltage exceeding the first predetermined level voltage is applied. When the neon tube Ne lights up, the NL1 signal is sent from a NL1 terminal to the CPU 15 in FIG. 1. The first predetermined amount determines the characteristics of the neon tube Ne.

When the timer completes measuring 20 seconds, the CPU 15 turns the SBO signal from a low level to a high level and outputs the SBO signal to the SBO terminal. When the high level SBO signal inputs to the SBO terminal, the transistor Q1 is turned off. Turning the transistor Q1 off causes the transistor Q3 to turn off and the pressure increasing circuit stops. In other words, the charging to the main condenser C4 stops.

During charging of the main condenser C4, the condenser C2 is charged by the electric current running through the resistor R4. When the SBT signal is input from the CPU 15 to a SBT terminal, the thyristor SCR turns on. When the thyristor SCR turns on, the electric charge is discharged from the condenser C2. The voltage increased by the transformer TC ignites the xenon tube Xe. The xenon tube (Xe) emits flash lighting using the electric charge accumulated in the main condenser C4.

The control of camera functions in accordance with the invention will now be described. CPU 15 is configured or programmed to cause predetermined processing or control routines (sequences of camera functions, operations and processes) to be performed when a power switch (not shown) is turned ON, and responsive to the output of the main condenser voltage detection circuit 14 and the half-depression and full-depression switch S1 and S2 signals, and based on the output of the photometry circuit 16. The CPU 15 performs several processing or control routines including a master or main routine and a half-depression routine.

Figure 3:
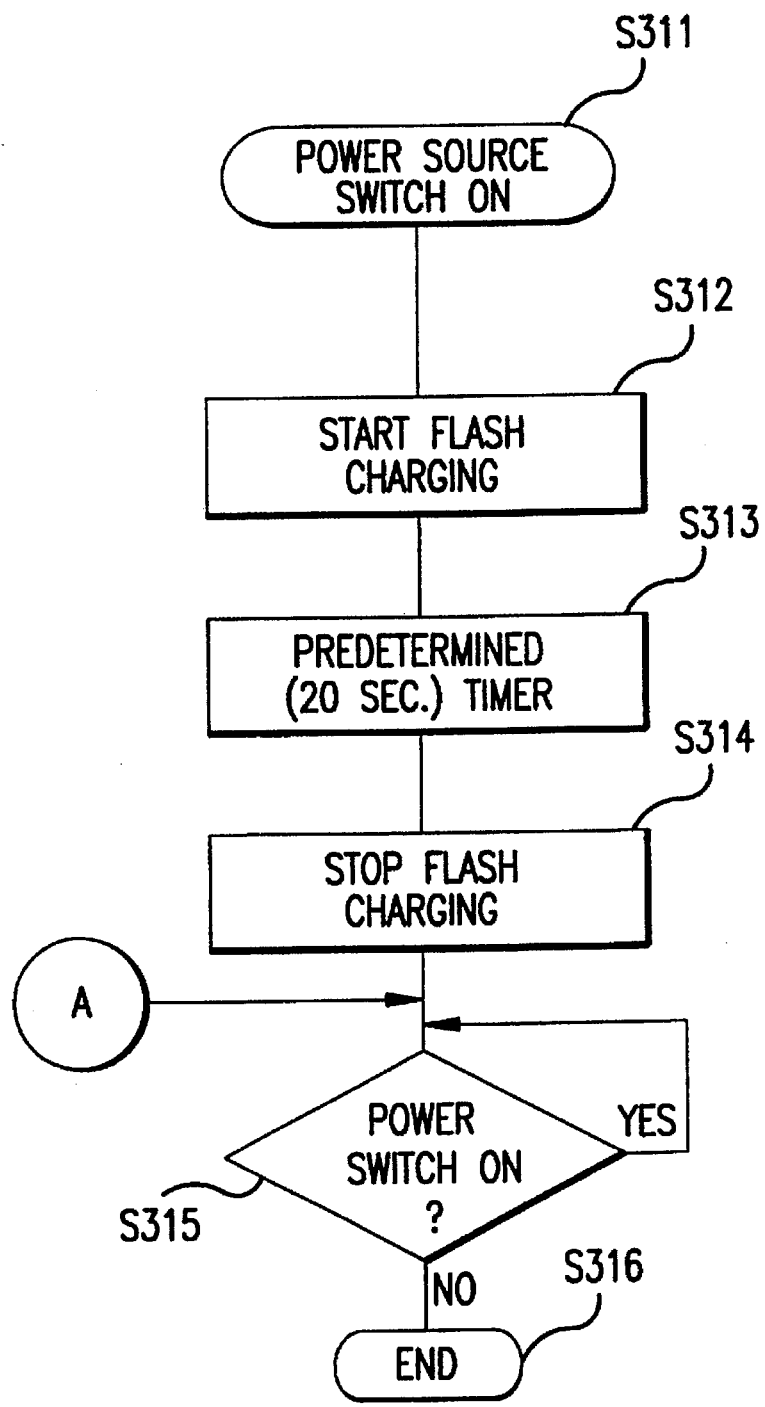
FIG. 3 is a flow chart showing a main control routine that is initiated in response to operation of a power source switch.

Referring to FIG. 3, the main routine will now be described. The main routine starts when the power source switch (not shown) is turned on. After the power source switch is turned on in step S311, a flash charging routine (steps S312–S314) is performed. In step S312, the low level SBO signal is output from the CPU 15 to the SBO terminal to start flash charging (i.e. main condenser 13 charging). In step S313, the 20 second timer (not shown) preferably embedded in the CPU 15 starts counting time. When the 20 second timer elapses, the SBO high level signal is input to the SBO terminal from the CPU 15 to stop flash charging in step S314. At this time, the electric charge amount accumulated in the main condenser 13 is greater than or equal to the first predetermined amount and less than the maximum voltage of the main condenser 13. Charging of the main condenser is complete. Then, the CPU 15 continues to step S315 and enters an operation waiting status. Operation waiting status refers to a condition where the CPU 15 waits for the operation of the flash mode selection switch 17, the half-depression operation of the release button (switch S1), and the turning off operation of the power source switch (not shown), and the like. When the power source switch (not shown) is off in step S315, the camera main routine is terminated in step S316.

Figure 4:
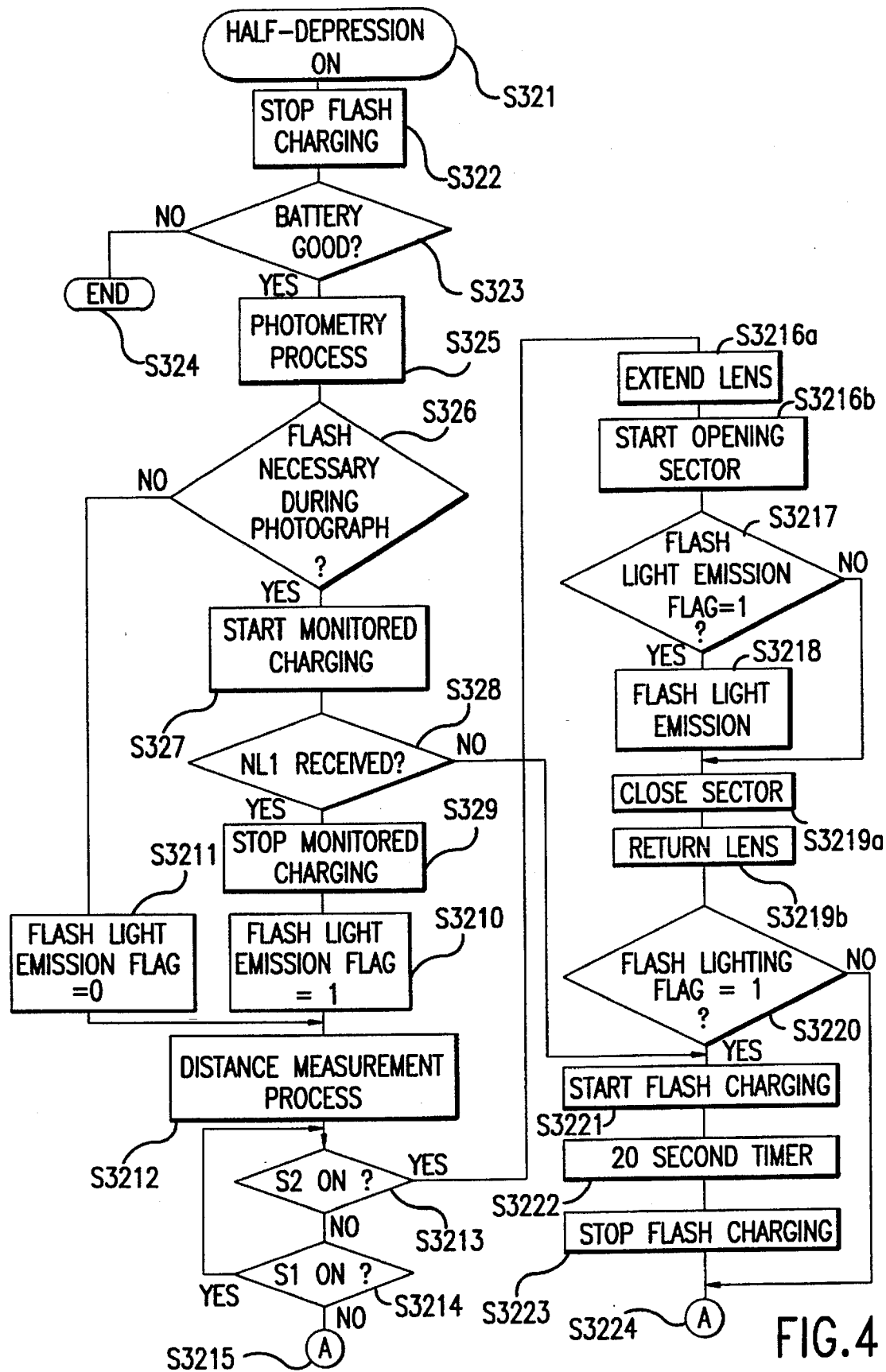
FIG. 4 is a flow chart showing a control subroutine that is initiated in response to half depression of a shutter release button.

Referring to FIG. 4, the first preferred embodiment of the half-depression routine will now be described. As noted above, the half-depression operator routine commences when the release button (not shown) is half-depressed and the switch S1 turns ON (step S321). The half-depression routine of FIG. 4 preferably interrupts the main routine of FIG. 3.

In step S322, because the switch S1 is ON, the high level SBO signal is input to the SBO terminal from the CPU 15 to terminate the charging to the main condenser. In step S323, the battery 11 is checked. If the battery 11 tests no-good, the half-depression routine is terminated in step S324. Preferably an alarm display notifies the operator of the low-battery condition. If the battery 11 charge tests sufficient for further camera operations in step S323, the CPU 15 continues to step S325 where the photometric process (measuring of object illuminance) is executed by the photometry circuit 16. The resulting data from the photometric process can be stored in the CPU 15.

In step S326, the determination is made whether the flash is to be fired during photographing. The flash firing determination is made based on the state of the flash mode selection switch 17 and the data from the photometric process indicating the degree of object illumination. If the auto flash mode is selected by the flash mode selection switch 17, the CPU 15 determines whether the photometric value is larger than a predetermined photometric value in step S326. If the flash prevention mode is selected, or if the auto flash mode is selected and the photometric value is larger than the predetermined value, the flash is determined to not be necessary in step S326. In this case, the CPU 15 continues to step S3211 where the flash light emission flag (flash lighting flag) is set to "0". In other words, the flash firing determination that the flash is prevented during photographing is stored.

When the forced flash mode is selected or when the auto flash mode is selected and the photometric value is smaller than the predetermined photometric value (i.e. the object illuminance is low and light emission by the xenon tube Xe is needed), the flash is determined to be necessary in step S326. In this case, the CPU 15 continues to S327. In step S327, because the flash will be fired, the CPU 15 inputs the SBO low level signal to the SBO terminal and executes monitored charge routine. The monitored charge routine is charging performed within a predetermined short period of time that starts at step S327, continues for a time necessary to determine NL1 in step S328 and completes at step S329. The NL1 determination takes place during monitor charging. NL1 determination preferably refers to receipt by the CPU 15 of the NL1 signal output from the NL1 terminal. In other words, the NL1 determination determines whether the electric charge amount accumulated in the main condenser 13 has reached the first predetermined amount. If the NL1 signal is output from the terminal NL1 to the CPU 15, the charge is completed. In this case, the CPU 15 continues to step S329. If the NL1 signal is not output from NL1 terminal to the CPU 15, the charging is not completed. Then, the CPU 15 continues to step S3221. When the CPU 15 continues to step S329, the SBO high level signal is input to the SBO terminal from the CPU 15 and the monitored charge routine is stopped. Then, the flash light emission flag is set to "1". The flash firing determination that the flash is to be fired during photographing is stored.

In step S3212, the distance measurement process is performed. In step S3213, the CPU 15 determines whether the release button is fully depressed responsive to the S2 switch. If the release button is not fully depressed (S2 switch off), the CPU 15 determines whether the release button is half depressed in step S3214. If the release button is not half depressed (S1 switch off), the CPU 15 continues to step S3215 where the CPU 15 returns to A in the main routine (FIG. 3).

If the release button is fully depressed (S2 switch on) in step S3213, the CPU 15 performs steps S3216a to S3219b. From an initial position, in step S3216a the shooting lens extends based on the result of the distance measurement. The sector (shutter blade) begins to open in step S3216b. The value of the stored flash light emission flag is determined in step S3217. When the flash light emission flag is "1", the CPU 15 outputs the SBT signal to the SBT terminal and initiates the xenon tube (Xe) to emit flash lighting in step S3218. The sector is closed in step S3219a. Then, the lens is returned to the initial position in step S3219b.

In step S3220, the CPU 15 again determines the value of the flash light emission flag. If the flash light emission flag is "0", the CPU 15 continues to step S3224 where the CPU 15 returns to A in the main routine (FIG. 3).

If the strobe light emission flag is "1" in step S3220 (i.e., flash (strobe) light emission takes place during exposure), the CPU 15 continues to step S3221. As set forth above, if the NL1 determination is that charging is not complete in step S328, because the flash firing determination is that the flash will be fired during photographing and the electric charge amount accumulated in the main condenser has not reached the first predetermined amount, the CPU 15 continued to step S3221. In either case, in step S3221 the flash charging routine of the main condenser starts. The flash charging routine from step S3221 to step S3223 is the same as the process from step S312 to step S314. Therefore, the explanation is omitted here. Further, if the CPU 15 continues from step S328 to step S3221, the monitored charge routine started in step S327 is pre-empted by the flash charging routine of steps S3221–S3223.

In step S3224, the half depression routine is complete and the CPU 15 returns to A in the main routine (FIG. 3).

Figure 5:
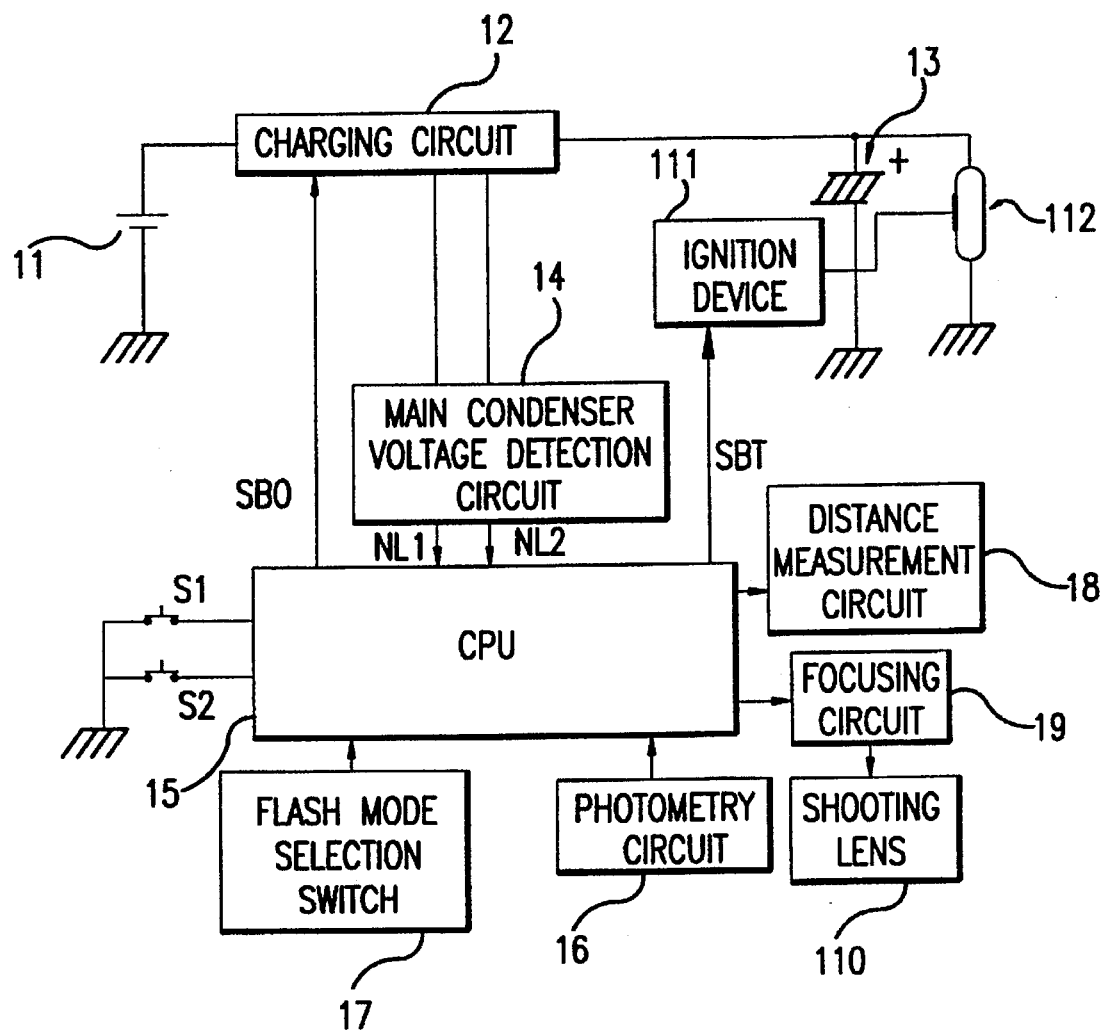
FIG. 5 is a partial block diagram of camera circuitry according to another embodiment of the present invention.

A second preferred embodiment of the present invention will now be described. Referring to FIG. 5, a power source switch (not shown) is turned ON, the CPU 15 outputs the SBO low level signal to the charging circuit 12 to start charging of the main condenser 13. When the electric charge amount accumulated in the main condenser 13 reaches the first predetermined amount, an NL1 signal is sent from the main condenser voltage detection circuit 14 to the CPU 15. Then, the main condenser 13 charging continues until the electric charge amount accumulated in the main condenser 13 reaches a second predetermined amount and an NL2 signal is sent from the main condenser voltage detection circuit 14 to the CPU 15. The second predetermined amount preferably refers to an electric charge amount greater than the first predetermined amount, but less than the maximum voltage of the main condenser 13. Upon receiving the NL2 signal, the CPU 15 outputs the SBO high level signal to the charging circuit 12 to stop the main condenser 13 charging. A detailed explanation of charging starting/stopping timing will be described below.

When the release button (not shown) is half-depressed, the switch S1 is turned ON. When the switch S1 turns on during charging of the main condenser 13, the CPU 15 outputs the SBO high level signal to the charging circuit 12 to stop the main condenser 13 charging. Then, the CPU 15 measures the photographic object illuminance using the photometry circuit 16 and stores the result. In addition, the CPU 15 determines it is necessary to fire a flash for the photograph. The flash firing determination again is based on the condition of the flash mode selection switch 17 and the resulting data of the photometry process by the photometry device 16. The flash mode selection switch 17 selects among the auto flash mode, the flash prevention mode, and the forced flash mode.

When the release button (not shown) is fully depressed, the switch S2 is turned ON. Upon the turning the switch S2 ON, the CPU 15 controls further camera operations based on the flash firing determination whether a flash is needed, and, if necessary, whether the NL1 signal has been received. Further camera operations may include controlling the distance measuring process, controlling the focusing circuit 19 to drive the shooting lens 110, and controlling the ignition device 111 and the light emitting tube Xe 112 to emit flash lighting.

Figure 6:
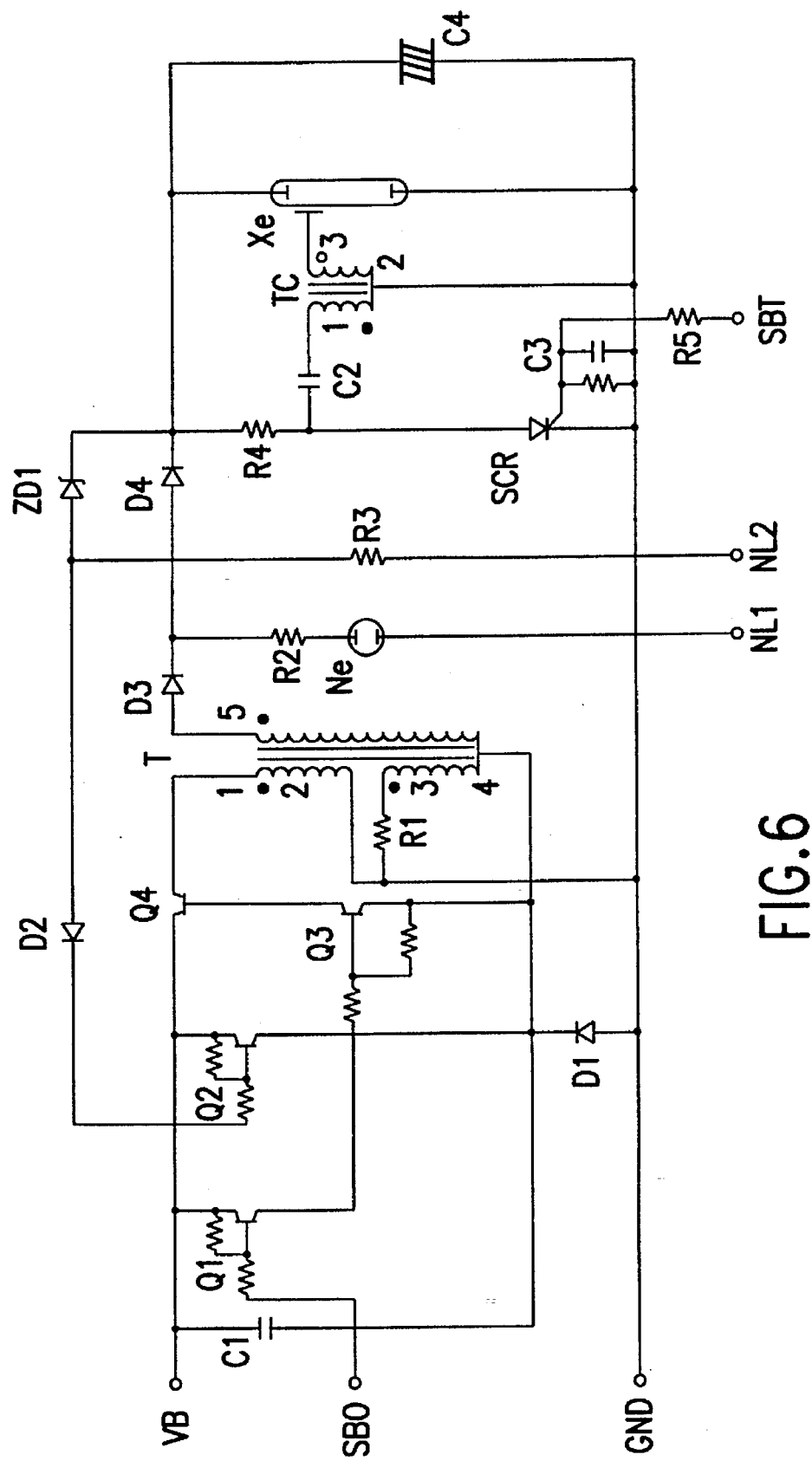
FIG. 6 is a circuit diagram showing a charging circuit, a main condenser, a main condenser voltage detection circuit, an ignition device, and a light emitting tube according to the camera of FIG. 5.

As shown in FIG. 6, the battery applies a voltage between the terminal VB and the terminal GND. When the power source switch is turned on, the pressure increasing circuit including the blocking oscillator starts operation. The blocking oscillator operates the same as discussed above to charge the main condenser C4 to the first predetermined amount. Therefore, the detailed discussion is omitted here. Again in FIG. 6, the first predetermined amount determines the characteristics of the neon tube (Ne).

When the electric charge amount stored in the main condenser C4 reaches the second predetermined amount, a Zener diode ZD1 is turned on. Thus, the Zener diode ZD1 turns on when a voltage greater than the second predetermined voltage level is applied. The electric current passing through the Zener diode ZD1 is output from a NL2 terminal after passing through a resistor R3. The electric current output from the NL2 terminal is input to the CPU 15 as an NL2 signal (FIG. 5). The second predetermined amount determines the characteristics of the Zener diode ZD1.

Upon receiving an NL2 signal, the CPU 15 outputs the SBO high level signal to the SBO terminal. When the SBO high level signal is input to the SBO terminal, the transistor Q1 is turned off. Turning off the transistor Q1 causes the transistor Q3 to turn off and stops the pressure increasing circuit. In other words, the main condenser C4 stops charging.

Further, if the SBO high level signal is not input to the SBO terminal from the CPU 15 because of an error or the like, charging continues even if the electric charge amount accumulated in the main condenser C4 exceeds the second predetermined amount. The charging continues until the electric charge amount accumulated in the main condenser C4 reaches a third predetermined amount. Upon reaching the third predetermined amount, the electric current output from the Zener diode ZD1 passes through the diode D2 and turns the transistor Q2 on. The third predetermined amount preferably refers to an electric charge amount greater than the second predetermined amount, but less than the maximum voltage of the main condenser C4. Turning the transistor Q2 on causes the transistor Q4 to turn off and stops the pressure increasing circuit. In other words, even if the SBO signal remains the SBO low level signal because of a malfunction and the like, the main condenser C4 charging is prevented from exceeding the maximum voltage.

During charging of the main condenser C4, the condenser C2 is charged by electric current passing through a resistor R4. When an SBT signal is input from the CPU 15 to the SBT terminal, the thyristor SCR turns on. Turning the thyristor SCR on discharges the electric charge of the condenser C2. The voltage raised by the transformer TC ignites the xenon tube (Xe). The xenon tube (Xe) then emits flash lighting using the electric charge accumulated in the main condenser C4.

Figure 7:
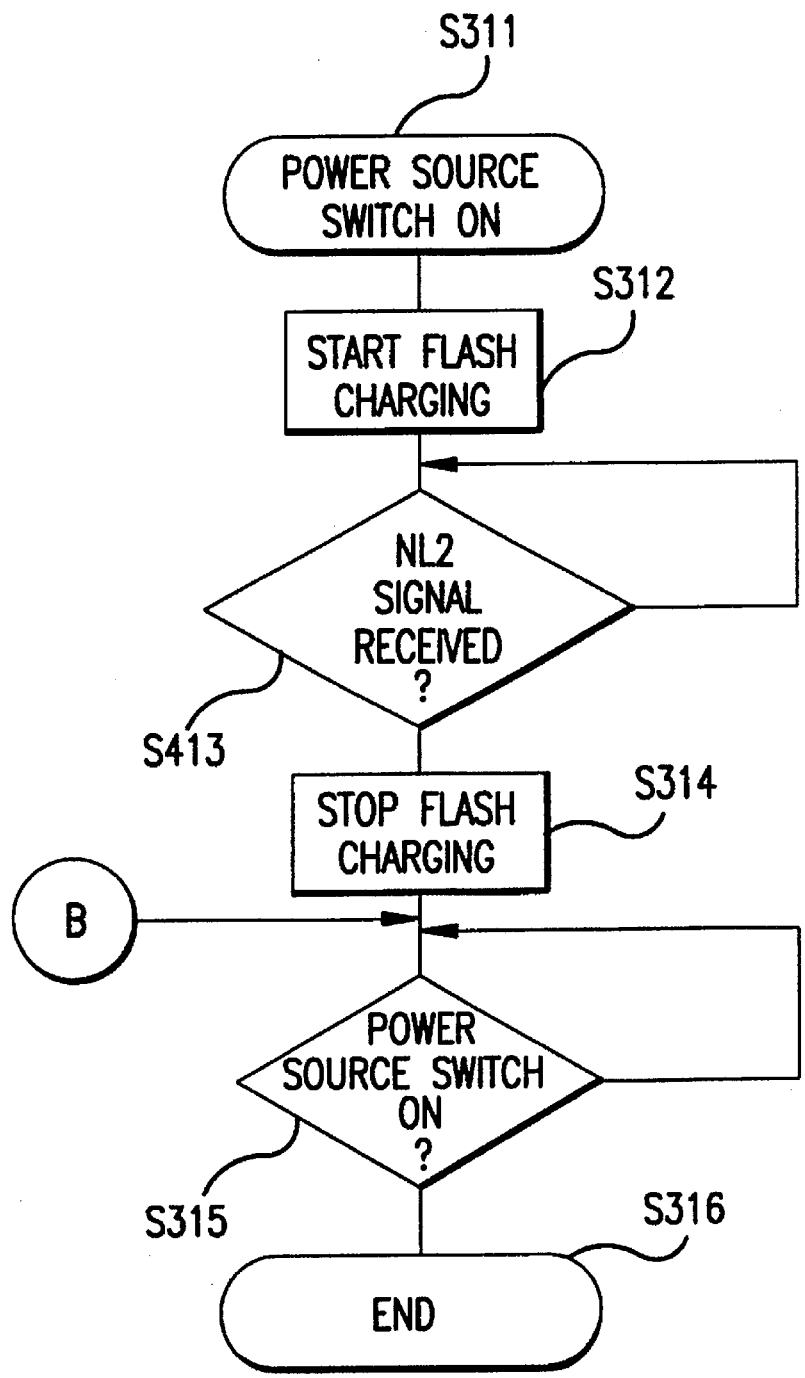
FIG. 7 is a flow chart showing a main control routine that is initiated in response to the operation of the power source switch.

Referring to FIG. 7, the main routine of the second preferred embodiment will now be described. The main routine starts when the electric power source switch (not shown) is turned on. FIG. 7 differs from FIG. 3 only in the method by which the main condenser 13 charging stops when charging is completed. The other processes in FIG. 7 are the same as those in FIG. 3. Therefore, the detailed explanation will be omitted. In steps S312–S314 (FIG. 3), the main condenser flash charging routine is stopped when the 20 second timer has elapsed. In contrast, the main routine of FIG. 7 does not use a timer. In step S413, the main condenser charging is stopped by performing a NL2 determination. The NL2 determination preferably refers to whether the NL2 signal from the NL2 terminal has been received by the CPU 15. In other words, whether the electric charge accumulated in the main condenser has reached the second predetermined amount. If the CPU 15 has received the NL2 signal in step S413, charging is complete. Otherwise, charging to the second predetermined amount is not complete. If there is an error to the SBO signal or the like, charging may be complete to the second predetermined level, but charging will continue to the third predetermined level. After charging of the main condenser 13 starts, if the NL2 determination is that charging is not complete, the CPU 15 executes a control loop that repeats step S413 until charging is complete. When charging is complete, the main condenser 13 stops charging.

Figure 8:
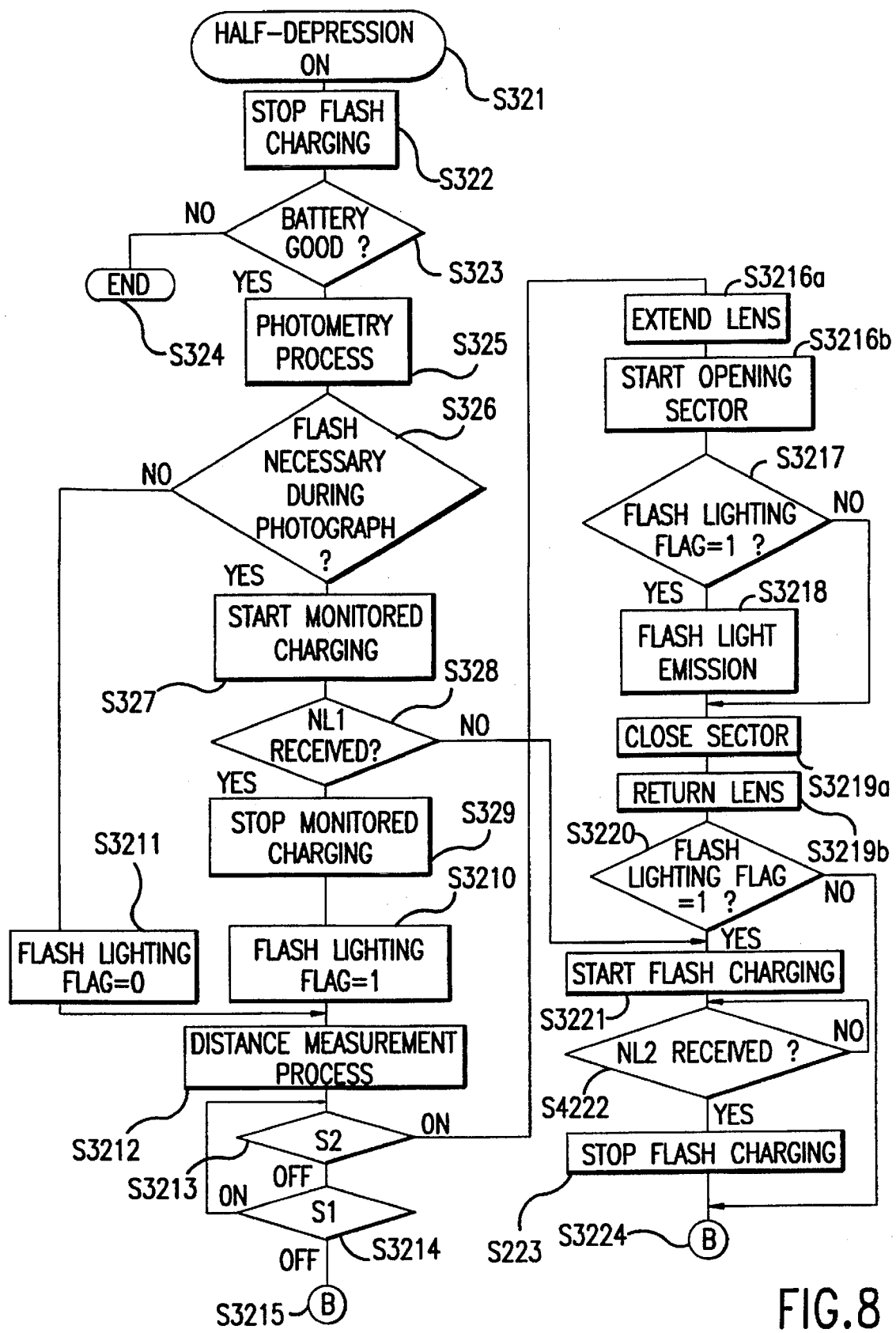
FIG. 8 is a flow chart showing a control subroutine that is initiated in response to half depression of the shutter release button.

Referring to FIG. 8, the second preferred embodiment of the half depression routine will now be described. The half depression routine of FIG. 8 is the same as shown in FIG. 4 with the exception of step S4222. Step S4222 uses the same process as step S413. Therefore, a further explanation is omitted.

In the main routine shown in FIG. 3, elapsing of the 20 second timer is considered charging complete. However, the battery voltage can be consumed from use and the like. Because the battery voltage level can vary, charging could be stopped even if the electric charge accumulated by the main condenser does not reach the second predetermined amount.

In the main routine and half depression routine shown in FIGS. 7 and 8, respectively, charging continues until the electric charge stored by the main condenser reaches the second predetermined amount independent of the time required. Therefore, in the second embodiment, when the battery level is above the minimum level required (see step S323), the main condenser is charged until the second predetermined amount is reached.

Figure 9A:
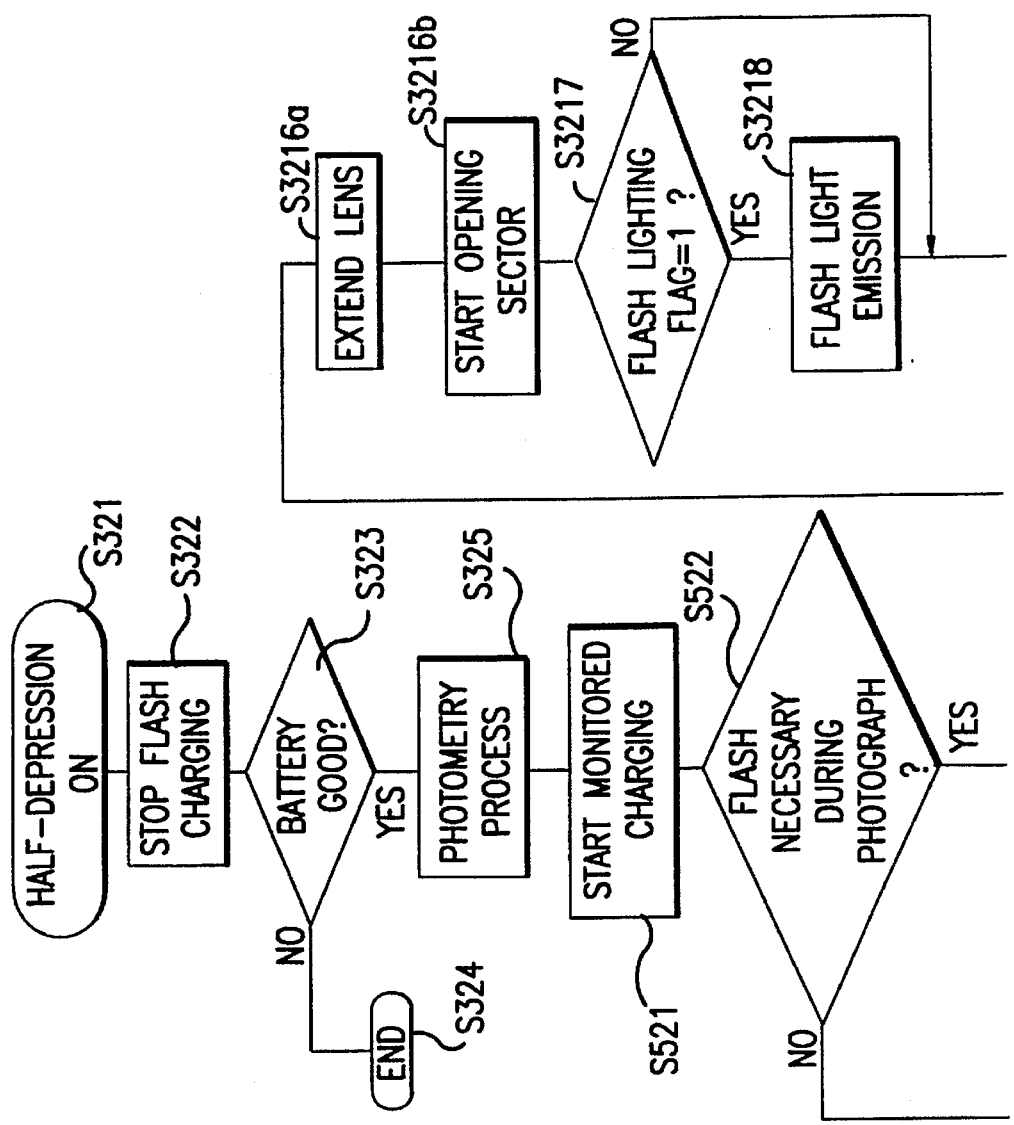

Referring to FIGS. 9A–9B, the third preferred embodiment of the half-depression routine will be described. FIGS. 9A–9B shows the half-depression routine that uses the device as explained with reference to FIGS. 1 and 2. The half-depression routine of FIGS. 9A–9B preferably interrupts the main routine shown in FIG. 3. When the main routine of FIG. 3 is interrupted by the half-depression routine of FIGS. 9A–9B, steps S321 to S325 are performed. Steps S321–S325 are described above with reference to FIG. 4.

Upon completion of step S325, monitored charging takes place during steps S521–S529 as shown in FIGS. 9A–9B. Monitored charging begins in step S521. The flash firing determination is made in step S522. As discussed above in step S326, the result of the flash firing determination sets the flash light emission flag to 1 or 0. When the flash light emission flag is 1, the flash is to be fired during photographing and the CPU 15 continues to step S523. When the flash light emission flag is 0, the flash is not fired during photography and the CPU 15 continues to step S526. Next, NL1 determination is performed in steps S527 and S524. The NL1 determination is made independent of the flash firing determination in step S522. Only when the NL1 determination is that charging is not complete at the step S524, the CPU 15 continues to step S3221. This is the case where charging of the main condenser is not complete and light emission by the xenon tube (Xe) is necessary during exposure of the photograph. In step S3221, the flash charging routine of steps S3221–S3223 begins, then the CPU 15 continues to step S3224.

Otherwise, in step S525 the flash charging completion flag is set to 1 indicating that the NL1 determination is charging completed. In contrast, in step S528 the flash charging completion flag is 0 to indicate that the NL1 determination is charging not completed. After setting the flash charging completion flag, monitored charging is stopped in step S529. Then, the CPU 15 continues to step S3212 where the distance measurement process is performed.

Upon completion of the distance measurement process in step S3212, the CPU 15 executes a control routine and waits for the full depression of the release button in step S5210 or waits for the release of the half depression in step S5211. If the half-depressed release button is released, the CPU 15 continues to step S5213 where the value of the flash charge completion flag is determined. If the flash charge completion flag is 1, the CPU 15 continues to step S3224.

If the flash charge completion flag is 0, the CPU 15 continues to step S3221. In other words, the NL1 signal was not received and the flash firing determination was that flash lighting is prevented or unnecessary, and in addition, the half depression of the release button is released without executing the exposure process. The charging processes of steps S3221–S3223 are performed. Then, in step S3224, the CPU 15 returns to A in the main routine shown in FIG. 3.

When the release button is fully depressed at step S5210, the exposure operation of steps S3216a–S3219b is performed. Upon completion of the exposure operation, the CPU 15 again determines the value of the flash light emission flag at step S3220. Step S3220 and steps S3221–S3224 are the same as described with reference to FIG. 4, and the detailed explanation is omitted here.

The third preferred embodiment half-depression routine shown in FIGS. 9A–9B guarantees that charging resumes when the half depression of the release button is released without performing the exposure operation during the charging not completed condition.

In a camera as shown in FIGS. 1–9B, the light emission determination device determines whether the light emission tube emits light during exposure. If the light emission determination device determines to prohibit the light emission tube from emitting light during exposure, distance measurement operation is allowed independent of a determination by the electric charge amount determination device. In other words, if the light emission tube is unnecessary or prohibited during exposure, distance measurement operation is performed even if the accumulated charge of the condenser has not reached the predetermined amount. Therefore, photographing delays because of unnecessary condenser charging are avoided.

Further, if the light emission determination device determines to prohibit the ignition of the light emission tube during exposure, the determination by the electric charge amount determination device can also be prohibited. Therefore, an unnecessary determination operation is avoided and electric power is conserved. Also, the time needed to determine the electric charge amount of the condenser is conserved.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A camera having a power switch, the camera comprising:

a distance measurement circuit that measures a distance between the camera and a photographic object;

a condenser that when charged stores sufficient electric charge for a flash lighting of the photographic object during exposure;

an electric charge amount circuit that determines whether the condenser has been charged to a predetermined amount prior to the distance measurement by the distance measurement circuit, the electric charge amount circuit prohibiting the distance measurement circuit from measuring the distance between the camera and the object when the electric charge amount stored in the condenser does not reach the predetermined amount; and a light emitting determination circuit that selects one of emitting the flash lighting during exposure and preventing the flash lighting during exposure, the distance measurement circuit measuring the distance between the camera and the object when the light emitting determination circuit prevents the flash lighting during exposure regardless of the determination by the electric charge amount circuit, the condenser charging after actuation of the power switch and prior to the light emitting determination circuit selecting the one of emitting and preventing.

2. The camera according to claim 1, further comprising a charging circuit that charges the condenser when the power source switch is actuated.

3. The camera according to claim 2, wherein the charging circuit charges the condenser for a predetermined time to store a charge greater than the predetermined amount.

4. The camera according to claim 1, further comprising a charging circuit that charges the condenser when the power switch is actuated until the stored charge in the condenser is greater than the predetermined amount.

5. The camera according to claim 1, wherein the light emitting determination device selects the one of emitting and preventing before the electric charge amount circuit determines whether the condenser has been charged to the predetermined amount.

6. The camera according to claim 1, where the light emitting determination device includes a photometric circuit that measures the illuminance of the object, the light emitting determination circuit preventing the flash lighting during exposure when the object illuminance is at least a predetermined value.

7. The camera according to claim 1, further comprising a light emitting tube electrically connected to the condenser that emits the flash lighting to illuminate the object during exposure.

8. The camera according to claim 1, wherein the light emitting determination circuit selects the one of emitting and preventing based on a flash mode detection switch and a photometric circuit.

9. A camera having a power switch, the camera comprising:

distance measurement means for measuring the distance between the camera and a photographic object;

charge storage means for storing sufficient charge for a flash lighting of the photographic object during exposure, the charge storage means storing charge at least when the power switch is actuated;

charge amount determination means for determining whether the charge storage means has been charged to a predetermined amount prior to the distance measurement means measuring the distance between the camera and the object, the charge amount determination means prohibiting the distance measurement means from measuring the distance between the camera and the object when the electric charge amount accumulated in the charge storage means does not reach the predetermined amount; and light emitting determination means for selecting one of emitting the flash lighting during exposure and preventing the flash lighting during exposure, the light emitting determination means selecting the one of emitting and preventing after the power switch is actuated to store charge in the charge storage means and prior to the distance measurement means measuring the distance between the camera and the object, the distance measurement means measuring the distance between the camera and the object when the light emitting determination means prevents the flash lighting during exposure regardless of the determination by the charge amount determination means.

10. The camera according to claim 9, wherein the light emitting determination means selects the one of emitting and preventing prior to the charge amount determination means determining whether the charge storage means has been charged to the predetermined amount.

11. The camera according to claim 9, where the light emitting determination means includes a photometric device measuring the object illuminance, the light emitting determination means preventing the flash lighting during exposure when the object illuminance reaches a predetermined illuminance value.

12. The camera according to claim 9, further comprising a light emitting device electrically connected to the charge storage means that emits the flash lighting to illuminate the object during exposure.

13. A camera for use with an electronic flash device having an electronic flash tube that emits flash lighting to illuminate an object to be photographed, a power switch, a condenser electrically connected to the electronic flash tube, a charge determination circuit that determines whether the condenser is completely charged and a charging device that charges the condenser at least on actuation of the power switch, the condenser when completely charged carrying sufficient charge for the flash lighting, the camera comprising:

a manual switch;

a distance measurement device that measures the distance between the camera and the object based on the operation of the manual switch;

a light emitting determination device that determines one of emitting flash lighting from the electronic flash tube and preventing flash lighting from the electronic flash tubes; and a controller that prohibits the distance measurement by the distance measurement device when the charge determination device detects that the condenser is not completely charged, the controller allowing the distance measurement device to measure the distance when the light emitting determination device determines to prevent flash lighting from the electronic flash tube regardless of the condenser charge.

14. A method for operating a flash camera having a condenser that stores charge for a flash lighting of an object, a first power switch and a second manually operable switch, the method comprising the steps of:

charging the condenser upon actuation of the first switch;

interrupting the charging step upon actuation of the second switch;

determining whether the flash lighting will be used;

performing a distance measurement between the camera and the object if the flash lighting will not be used; and performing the distance measurement between the camera and the object if the flash lighting will be used and the condenser is charged to at least a predetermined value.

15. The method of claim 14, further comprising the step of performing lens focusing upon the actuation of the second switch for a second time.

16. The method of claim 14, wherein the charging step comprises charging the condenser for a predetermined time.

17. The method of claim 14, wherein the charging step comprises charging the condenser until a condenser charge level is greater than a predetermined level.

* * * * *